(No Model.)
W. S. BAIRD.
MEASURING BOTTLE.
No. 532,630. Patented Jan. 15, 1895.
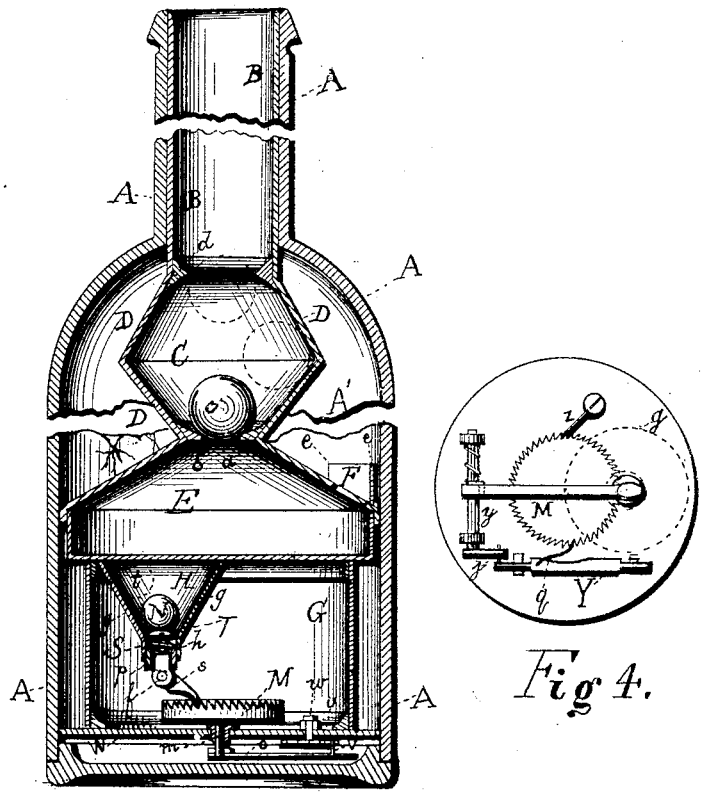
Fig 1.
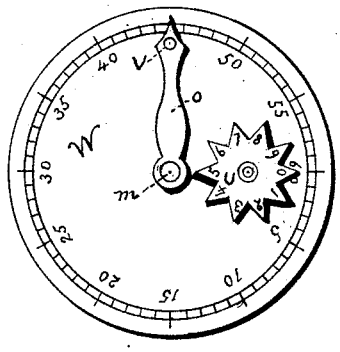
Fig 2.
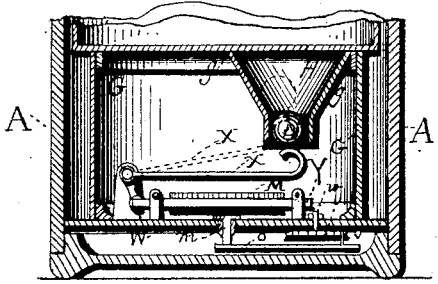
Fig 3.
Fig 4.
WITNESSES:
Eugene P. Eadson
Wm J Rines
INVENTOR
W. S. Baird
BY Geo. H. Holgate
ATTORNEY
THE NORRIS PETERS CO., PHOTO-LITHO., WASHINGTON, D. C.

UNITED STATES PATENT OFFICE.

WILLIAM S. BAIRD, OF PHILADELPHIA, PENNSYLVANIA.

MEASURING-BOTTLE.

SPECIFICATION forming part of Letters Patent No. 532,630, dated January 15, 1895.

Application filed March 6, 1894. Serial No. 502,547. (No model.)

*To all whom it may concern:*

Be it known that I, WILLIAM S. BAIRD, a citizen of the United States, residing at Philadelphia, in the county of Philadelphia and State of Pennsylvania, have invented a new Automatic Measuring, Indicating, and Registering Machine for Bottles or other Vessels to Contain Liquids, of which the following is a specification.
My invention relates to the application of an automatic measuring, indicating and registering machine to bottles or other vessels, composed or manufactured of any desired material, for containing liquids of all descriptions, and the objects of my inventon are, first, to provide a bottle or any other vessel of any description with an automatic, measuring, indicating and registering device; second, to supply a ready and reliable means of automatically measuring any desired quantity of the contents of the bottle or other vessel, and registering the same, thereby insuring accurate measurement, and a true register of, the number of each measurement, taken from the bottle or other vessel used; third, the providing of a safe and desirable accurate means of measuring medicinal remedies, where measure is a desideratum, and also the registering of the number of doses taken from the bottle or vessel, and therefore providing a safe-guard against mistakes being made; fourth, the supplying of a convenient and reliable means of measuring the quantity and registering said quantities for use in laboratories and chemical or other operations; fifth, the providing of a bottle or vessel which shall be useful as a receptacle or means of conveyance of liquids of every description, and an automatic measuring, indicating and registration of all or any part of its contents being removed; and, sixth, making a bottle or decanter, for the retailing of expensive cordials, and all spirituous or other liquids, in dispensaries or places of refreshment and entertainment, for the accommodation of the public, and rendering it unnecessary to make measurement, as the bottle, conveyer, or vessel, embracing my self-measuring, indicating and registering device, prevents the customer from taking more than the desired quantity, and in the event of a double quantity being taken, poured or drawn, such quantity will equally be recorded and registered for the guidance of the vender, and equally provides a check or guide for proprietors over employés, as to the number of, and quantities that have been served from the bottle or other vessel.

To accomplish the purposes of my invention, I construct a false or inner lining for the bottle or other vessel, which is so arranged that there is a free passage into or from a peculiarly arranged chamber, having flanged seats and a ball. This ball supplies the purposes of a valve, against exit, beyond that desired of any fluid contained in the vessel, or the entry of any air. Below this upper or first chamber I arrange a second, so constructed that the liquid contained by the bottle or other vessel, freely flows or enters through an opening properly located for the purpose, and this chamber being made of the exact capacity desired, constitutes the measure. Below this second or measuring chamber, I construct a third chamber to constitute the liquid tight casing, for the automatic, registering and recording mechanism, composed of a gravitating ball, confined in its cell, of special construction, and operating by gravity a pawl, or lever and pawl, engaging in a ratchet gear of special construction and thereby operating an indicating hand or index pointer, which in turn, at each complete revolution, operates a supplementary or registering index dial.

To fully describe the component parts of my invention; I construct a bottle or any other vessel as may be desirable for the purpose for which it is to be used, by providing an inner and entirely independent vessel, having its neck or upper or outer opening inside of the outer vessel. This neck descends into the outer vessel or bottle the desired depth, where its form is changed into a chamber having the form of two cones one over the other, the base of each cone forming the center or largest diameter of the cone. This cone-shaped chamber can be made round, square, octagon, triangular, or any other shape that will give it steep, sloping sides to the base of the chamber and the same steep, sloping sides, from half its height, more or less, to the top or juncture where it is joined to or merged into the neck or outer opening.

At the upper portion and surrounding the opening of this coned or other style of chamber, is a flange, so constructed that it forms a seat which conforms to the size and shape of a ball that is placed in the chamber. Should the bottle or vessel be turned completely upside down, this ball seats itself in the flanged seat and effectually closes the mouth of the chamber and prevents any more than the desired or measured quantity from escaping. At the base of this coned or other shaped chamber, I place a similar flange or seat, conforming to the ball, before mentioned, and thus supplying a reliable self-acting valve or stopper, which effectually excludes all dust or foreign matter from entering the liquids, and effectually prevents all waste that might occur from evaporation. The peculiar and special formation of this flanged seat for the ball, facilitates the refilling of the bottle or vessel. As the liquid is poured in at the opening above, it descends into the coned chamber, and having acquired by gravitation, more force or pressure than the weight of the ball, the ball is lifted or pushed aside and the liquid descends into the measuring chamber and thence to the receptacle proper. Below this chamber, described above, I construct a second one which may be formed in various ways to suit the requirements or purposes for which it is intended to be used, and so arranged that it will only have a capacity of the exact measure desired, or which constitutes the quantity of the measure to be given. On one side, preferably the upper one, there is an opening through which the very last contents of the bottle or vessel may enter the measuring chamber. Around this opening I place a shield or screen extending about one-fourth of the circumference of the bottle or vessel, for the purpose of preventing the too ready escape of the liquids from the measuring cell or chamber, in the event of the bottle being turned with the opening in the measuring cell or chamber facing downward. Immediately below the measuring chamber, or as may be preferred to suit particular requirements, I arrange a cased chamber, having an inner chamber cell with sloping sides at an angle of sixty degrees, more or less. In this inner chamber cell there is a moderately heavy ball, having sufficient weight, on descending by its own gravity, to strike and depress a concave buffer sustained by a spring, resting on the top of a base block secured in the extreme end of the gravity ball chamber or cell, and by its weight resting on the concave buffer, to keep depressed the buffer on the spring. At the end of this buffer is arranged the pawl, which rests on and engages with a ratchet gear, the action of which is as follows: The bottle or vessel, on being tilted or turned toward a horizontal line or right angle to its natural position, the gravity ball leaves its position of rest on the concave buffer and runs up or down the sloping side of the ball cell, and on the bottle or vessel being returned to its vertical or normal position, the ball rolls or drops with accelerated gravity and strikes down the concave buffer, and from which action, the pawl, by the downward push of the buffer, is given a thrust motion, thereby operating the ratchet wheel or gear. On the shaft or pivot carrying this ratchet or gear, is a pointer or index hand which for each motion imparted by the action of the pawl and ratchet, indicates a jump or measurement of a given distance or degree on the index dial. On the face of the index dial there is pivoted by suitable means a smaller dial, or record dial, so constructed that at each complete revolution of the pointer or index hand, on which there is a vertical and fixed pin that engages with the divisional degree pointer of the record dial, and as the index hand completes a revolution from its starting point on a plane with the center of the record dial wheel, the pin or index pointer pushes the record dial one degree or space, thereby recording that one complete revolution has been made and showing that the full number of divisions or measures as per the registering dial have been taken from the bottle or vessel.

I attain the several objects of my invention, as herewith described, by the mechanism and construction of my device, shown in the accompanying drawings, where for better illustration and to more clearly describe and explain the practical operation of my invention, I have confined my drawings and description, as would be adaptable to a bottle or other similar vessel or conveyer for liquids, as are now in general use.

Figure 1 shows a vertical section of a bottle constructed with my invention, and illustrates the practical application of the several parts and their relative positions. Fig. 2 is a plan of the face of the registering dial, showing that any number of measurements can be arranged, and on the larger, registering dial, is shown the smaller registering dial, having its circumferential edge deeply serrated with equal angular points between which the pin on the index hand or pointer enters and, in its movement at the completion of a revolution, pushes the small registering dial one degree or movement, and afterward passing on its course, leaving the small registering dial at rest. Fig. 3 is a sectional view showing a modification of the application of the pawl and ratchet wheel, operated by the gravitating ball striking a lever, which in turn operates a shaft controlling the motions of the pawl against the side ratchet wheel. Fig. 4 is a plan of the mechanism constituting my modification, shown in the sectional view. See Fig. 3.

Similar letters refer to the same parts throughout the various figures.

In Fig. 1. A is the bottle or vessel; B, the neck or lining tube conducting to the ball chamber or cell C, having the flange or ball seat $d$ at the juncture of the lining tube or neck B with the chamber or cell C; D, the sloping side of the ball chamber or cell C. $a$ is the lower flange or ball seat of the ball chamber or cell C on which the ball $c$ rests or seats itself, and closes the opening or passage $b$ leading and opening into the measuring chamber E; the opening or inlet and outlet of the measuring chamber E, as shown at F communicating with the interior of the bottle or vessel A'. $e$ is the screen or shield around the passage or opening F to prevent the liquids from too readily flowing back into the bottle or vessel. G is the side of the lower casing or chamber for the mechanism in which is the funnel, or other shaped, smaller chamber or confiner H, with its steep inclined sides $g$ $g$. In this confining chamber H, I place the gravitating ball N and at the base of this chamber, and closing its mouth or opening at $h$ a guiding block or seat $p$, which forms the rest or seat for the spring S which supports and forces up in position the buffer T, having, and supporting the pawl $s$, pivoted at $f$. This pawl $s$ resting on or against the ratchet wheel M is pushed each time the ball N descends or rolls down, after tilting the bottle or vessel and striking the buffer T forces it down, compressing the spring S, and on the bottle or vessel being tilted in the act of pouring or taking its contents, the ball N leaves its normal position of rest, and rolls or falls up to a position as shown at $t$, thereby relaxing its pressure by its weight on the buffer T and allowing the spring S to expand and by its expansion, imparting the necessary motion of raising the buffer T, carrying or drawing back the pawl $s$ the exact distance as may be required, and placing the several parts here described in a position ready to receive the ball N when it falls or rolls back to its normal or original position, by which action it strikes the buffer T depressing the spring S and this downward thrust pushes forward the pawl $s$, imparting the rotating motion to the ratchet wheel M which is securely fastened to the shaft $m$. Each motion of the ratchet wheel imparts a similar motion to the index pointer $o$, carrying at its outer end the pin $v$ which engages at each complete revolution of the index pointer $o$ in and against one of the serrated points constituting the small register dial $u$, which it turns in the same direction as itself. The dial $u$ is attached by a free pivot at $w$.

Fig. 2 shows a view of the registering dial W with its index pointer $o$ and the pin $v$ at its outer end, and the dial $u$. Looking at the dials shows that as the registering dial stands at $o$, that the index pointer has passed ten times, or made ten complete revolutions, and forty-five divisions of another, which would make a total of six hundred and forty-five portions or quantities having passed from the bottle or vessel.

Fig. 3 shows a section similar to Fig. 1, but having a modified form of applying the power or action of the ball N in striking on the end of a lever $x$ and imparting motion by its depression, through the shaft $y$, the crank $j$ and the sliding bar Y, having the spring pawl $q$ engaging with the ratchet wheel M. $z$ is a small stationary spring pawl, to prevent any backward motion that might be inclined to occur in the ratchet wheel M, and is equally applicable to the device shown in Fig. 1, though I have not shown it in that figure.

What I claim as my invention, and desire to secure by Letters Patent, is—

1. The combination with a liquid receptacle, of a lining for a portion of said receptacle; a chamber having its center enlarged and its ends contracted, formed at the base of said lining; valve seats located within and adjacent to the ends of said chamber; a ball located within said chamber adapted to form a valve; a measuring chamber, having its upper side inclined at an angle, located at the base of said valve chamber, and having an opening in its upper side, into the main portion of the receptacle; and measuring and indicating mechanism located within the main portion of said receptacle, substantially as described.

2. The combination with a liquid receptacle of the lining B; the chamber C, having the flanged seats $a$ and $d$, and the ball $c$; the measuring chamber E, having the opening F and guard screen $e$; the chamber G; the chamber H located within said chamber G, and having sloping sides $g$ and containing a gravity ball N adapted to operate the buffer T, the spring S and pawl $s$ said pawl operating the ratchet wheel M; and the fixed index pointer $o$ and pin $v$, connected to said ratchet wheel M, said ratchet wheel imparting its motion to said index pointer $o$ and said index pointer imparting its motion to the serrated registering dial $u$, as and for the purpose specified.

In testimony whereof I affix my signature in the presence of two witnesses.

WILLIAM S. BAIRD.

Witnesses:
EUGÈNE F. EADSON,
G. WHITNEY WOOD.